United States Patent [19]

Waters, Jr.

[11] Patent Number: 4,506,473
[45] Date of Patent: Mar. 26, 1985

[54] CARBON DIOXIDE GENERATOR INSECT ATTRACTANT

[75] Inventor: John Waters, Jr., Swansboro, N.C.

[73] Assignee: John G. Mills, II, Wake Forest, N.C.

[21] Appl. No.: 551,212

[22] Filed: Nov. 14, 1983

[51] Int. Cl.³ .............................................. A01M 1/02
[52] U.S. Cl. ........................................ 43/107; 43/114
[58] Field of Search ................. 43/107, 112, 113, 118, 43/124, 131, 132.1, 125, 129

[56] References Cited

U.S. PATENT DOCUMENTS

| | | | |
|---|---|---|---|
| 967,883 | 8/1910 | Crabtree | 43/113 |
| 4,006,065 | 2/1977 | Meresy et al. | 204/72 X |
| 4,283,878 | 8/1981 | Hill et al. | 43/114 |

OTHER PUBLICATIONS

*Why Mosquito Repellents Repel,* by R. H. Wright, Scientific American, vol. 233, (Jul. 1975), pp. 104–111.

Primary Examiner—Nicholas P. Godici
Assistant Examiner—M. Jordan
Attorney, Agent, or Firm—Mills & Coats

[57] ABSTRACT

This disclosure involves a method of chemically generating carbon dioxide for use as an insect attractant used in combination with an insect trap, and a generating unit adoptable for use with existing insect traps. Carbon dioxide is generated by reacting a carbonate salt with an aqueous acid solution, the carbon dioxide is directed into a trap for attracting insects. A generating unit is described which can be preassembled and activated at the site of the trap.

10 Claims, 3 Drawing Figures

CARBON DIOXIDE GENERATOR INSECT ATTRACTANT

FIELD OF INVENTION

This invention relates to a method for the generation of carbon dioxide as an insect attractant used in combination with an insect trap. This invention is particularly addressed to the problem of generating carbon dioxide in an in-field insect trap, and involves the reaction of a carbonate salt with a proton-donating acid to form carbonic acid which decomposes to form carbon dioxide and water. This invention is directed to both the method of generating carbon dioxide and a device to be used in combination with an insect trap.

BACKGROUND OF INVENTION

It is known that blood sucking insects which feed on mammals are attracted to carbon dioxide gas. This is particularly true of the mosquito and tick. Since carbon dioxide is the end product of mammalian metabolism, it is presnt in mammalian blood and functions as a natural attractant for blood sucking insects.

The insect attracting property of carbon dioxide has been known for a number of years, and this property has been ultilized in combination with insect traps to increase the efficiency of a trap by attracting insects to the vicinity of the trap. The method previously used for releasing carbon dioxide in the vicinity of the trap has been to place solid carbon dioxide, or dry ice, near the trap to act as an attractant. As the solid carbon dioxide converts to the gaseous form, the carbon dioxide gas is released in the air around the trap attracting insects toward the trap.

The method of using dry ice, however, is both expensive and inconvenient in the field located trap. Common problems involved are storage and transportation of the dry ice as well as frequent baiting of the trap.

SUMMARY OF INVENTION

The invention as described herein presents a novel method of chemically generating carbon dioxide as an insect attractant used in combination with an insect trap. The carbon dioxide is generated by reacting a carbonate salt with an aqueous acid. Carbonic acid is formed which decomposes to form carbon dioxide. The carbon dioxide is directed into the trap where it functions as an insect attractant.

The carbon dioxide is generated in a disposable device which can be used with existing insect traps. The device includes a reaction chamber having compartments within the reaction chamber which contain the carbonate salt and acid solution. This arrangement keeps the two chemicals separated until time of use. When the device is appropriately attached to an insect trap, generation of carbon dioxide is initiated by mixing the carbonate salt and acid solution. One means of mixing the two chemicals is by rupturing the compartments containing the respective chemicals. When mixing occurs, carbon dioxide is generated and it is conducted by a tube connecting the reaction chamber to the insect trap.

It is, therefore, an object of the present invention to provide a method for chemically generating carbon dioxide at the site of an insect trap.

Another object of the present invention is to generate carbon dioxide and direct it into an insect trap thereby increasing the efficiency of the trap.

Another object of the present invention is to generate carbon dioxide by reacting a carbonate salt with a proton-donating acid in a device at the site of an insect trap.

Another object of the present invention is to provide a device for generating carbon dioxide which is easily mountable on existing insect traps.

Other objects and advantages of the present invention will become apparent from a study of the following description and the accompanying drawings which are merely illustrative of such invention.

DESCRIPTION OF THE SPECIFIC EMBODIMENT

In a preferred embodiment of the invention, a carbonate salt is reacted with an aqueous acid solution to generate carbonic acid which decomposes to form carbon dioxide and water. Several readily available carbonate salts are suitable for this invention including sodium carbonate, sodium bicarbonate, calcium carbonate, magnesium carbonate, as well as compositions containing these carbonate salts.

Carbon dioxide generation is initated by mixing the carbonate salt with an aqueous acid solution. Suitable acids include acidic, sulfuric, hydrochloric, nitric, as well as other proton-donating acids. In this invention, aqueous solutions of about 5 to 80 percent by weight solutions are utilized.

In general, when a carbonate salt is reacted with a proton-donating acid, carbonic acid is formed. The carbonic acid decomposes to form carbon dioxide and water.

The carbonate salt and aqueous acid solution are contained in separate compartments of a container which functions as a reaction chamber. The carbon dioxide generating device is mounted under an insect trap. The generator is activated by mixing the carbonate salt and acid solution in a closed reaction chamber having a connecting tube to an insect trap.

Figure 1:
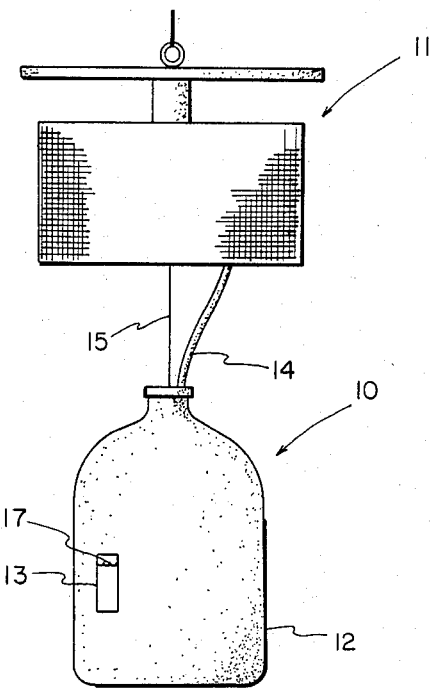
FIG. 1 is an elevated view of the carbon dioxide generating device.

With further reference to the drawings, FIG. 1 is an elevational view of the generating device, indicated generally at 10, appropriately associated with an insect trap, indicated generally at 11. The device includes a container 12 which functions as a reaction chamber, a compartment 13 within the reaction chamber for containing an acid solution, a tube 14 connecting the reaction chamber to the insect trap and a supporting attachment 15 for securing the generating device to said trap.

Figure 2:
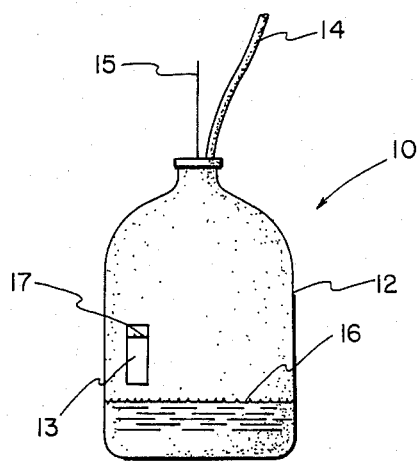
FIG. 2 is an elevated view of the generating device loaded with carbonate salt and acid solution prior to activation.
Figure 3:
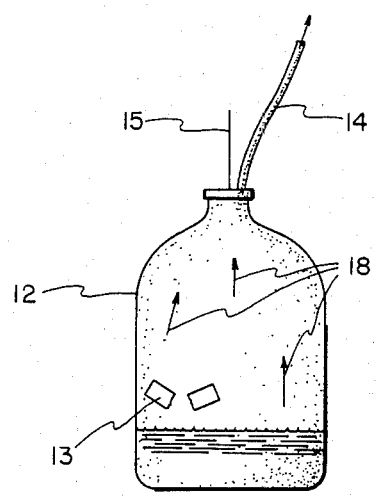
FIG. 3 is an elevated view of the generating device after activation by rupturing the compartment of acid.

FIG. 2 is an elevated view of the generating device loaded with chemicals but before activation of the generating device. By containing the carbonate salt 16 and acid solution 17 in separate compartments, the entire device can be assembled and stored until time of use. The means of mixing is by collapsing or rupturing the compartment containing the acid solution as shown in FIG. 3.

In one example of the invention, the carbonate salt 16 is contained in the lower end of the reaction vessel 12 and the acid solution 17 is contained in a built-in bladder or collapsible cylinder 13 within such reaction chamber. The bladder is made of plastic such that is can be ruptured by applying an external force. Rupturing of the bladder results in a mixing of the carbonate salt and aqueous acid.

As the carbonic acid is generated, it decomposes to form carbon dioxide and water. The carbon dioxide flows from the reaction chamber 12 into the insect trap 11 by a connecting tube 14.

In general, the nature of the reactants used in the generating device are such that there is a slow, continuous release of carbon dioxide in the trap. When the device 10 is mounted to the trap 11 by an attaching device such as a string or wire 15, agitation by the wind keeps the chemicals in constant activity.

In a preferred embodiment, the entire device including the reaction chamber, the internal bladder, and connecting tubing are made of disposable plastic. This method of invention is especially suited for an in-field trap in that the generating device can be disposable and replaced as needed.

In order to more fully illustrate the chemical nature of the invention and manner of use of the same, the following is presented:

In this example, the basic design is the same as shown in the drawings. The reaction chamber 12 is a 1000 ml plastic bottle. In the bottom of the reaction chamber is placed 100 grams of sodium carbonate 16. Contained within the reaction chamber is a bladder 13 of acetic acid 17, approximately 10 percent by weight. When the unit is to be used, the bladder 13 is ruptured by applying an external force releasing the acid solution 17 to react with the carbonate salt 16 to form carbon dioxide 18. This gas moves through tube 14 into trap 11 and acts as an attractant therein.

From the above it can be seen that the present invention provides a relatively inexpensive and yet highly efficient means of generating carbon dioxide for use as an attractant in insect type traps. This invention is lightweight, highly portable and far superior to earlier generators.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A device for generating carbon dioxide as an insect attractant in combination with an insect trap, comprising: a reaction chamber means; means connecting between said chamber means and said trap; an area within said chamber means containing a carbonate salt; a compartment means within said chamber means containing an aqueous acid solution; and means for bringing said acid solution in contact with said carbonate salt whereby carbon dioxide can be generated in said chamber and passed through said communicating means into said trap to act as an insect attractant.

2. The device of claim 1 wherein said compartment containing aqueous acid solution is a collapsible bladder having the property of rupturing from external pressure.

3. The device of claim 1 wherein said carbonate salt area is deposited in the lower portion of said reaction vessel.

4. The device of claim 1 wherein said reaction chamber is constructed from plastic inert to acidic and basic solutions.

5. The device of claim 1 wherein said reaction chamber is constructed from glass.

6. The device of claim 1 wherein said compartment means containing the aqueous acid solution is a collapsible plastic bladder.

7. The device of claim 1 wherein said compartment means containing the aqueous acid solution is a collapsible glass bladder.

8. The method of generating carbon dioxide as an insect attractant in association with an insect trap, comprising: reacting a mixture of a carbonate salt and aqueous acid in an amount sufficient to neutralize said carbonate salt at field temperature in a reaction chamber to form carbon dioxide; and passing said carbon dioxide into said trap whereby an improved insect attractant generating means is provided.

9. The method of claim 8 wherein said carbonate salt is selected from the group consisting of sodium carbonate, sodium bicarbonate, calcium carbonate, magnesium carbonate, and baking soda.

10. The method of claim 8 wherein said acid solution is an aqueous solution between 10 and 80 percent by weight acid selected from the group consisting of sulfuric, hydrochloric, nitric and acetic.

* * * * *